(12) United States Patent
Sandbote

(10) Patent No.: US 7,370,184 B2
(45) Date of Patent: May 6, 2008

(54) SHIFTER FOR ALIGNMENT WITH BIT FORMATTER GATING BITS FROM SHIFTED OPERAND, SHIFTED CARRY OPERAND AND MOST SIGNIFICANT BIT

(75) Inventor: Sam B. Sandbote, Reston, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 632 days.

(21) Appl. No.: 09/933,786

(22) Filed: Aug. 20, 2001

(65) Prior Publication Data

US 2003/0041229 A1    Feb. 27, 2003

(51) Int. Cl.
*G06F 9/315* (2006.01)
(52) U.S. Cl. .................... 712/300; 712/224
(58) Field of Classification Search ............ 712/224, 712/300; 711/201
See application file for complete search history.

(56) References Cited

U.S. PATENT DOCUMENTS

| | | | | |
|---|---|---|---|---|
| 4,495,598 A | * | 1/1985 | Vahlstrom et al. | 712/300 |
| 5,222,225 A | * | 6/1993 | Groves | 710/22 |
| 5,386,531 A | * | 1/1995 | Blaner et al. | 711/201 |
| 6,112,297 A | * | 8/2000 | Ray et al. | 712/225 |
| 6,523,108 B1 | * | 2/2003 | James et al. | 712/224 |

* cited by examiner

*Primary Examiner*—Kenneth S. Kim
(74) *Attorney, Agent, or Firm*—Sterne, Kessler, Goldstein and Fox P.L.L.C.

(57) ABSTRACT

An apparatus for shifting data is disclosed. The apparatus includes a shifter, a register, and a shift post processor. The shifter shifts an operand according to an offset parameter, thereby generating a shifted operand. The register is coupled to the shift post processor to transfer a shift carry operand stored in the register to the shift post processor, and coupled to the shifter to store the shifted operand after any transfer of the shift carry operand. The shift post processor is coupled to the shifter and the register to process the shifted operand to generate an output based on at least a control signal and a mask field. The shift post processor comprises a decoder to decode the offset parameter into the mask field, the mask field having a plurality of mask bits, each of the mask bits corresponding to a bit position of the shifted operand.

27 Claims, 10 Drawing Sheets

SHIFTER FOR ALIGNMENT WITH BIT FORMATTER GATING BITS FROM SHIFTED OPERAND, SHIFTED CARRY OPERAND AND MOST SIGNIFICANT BIT

BACKGROUND

1. Field of the Invention

This invention relates to computer architecture. In particular, the invention relates to processing units.

2. Background of the Invention

Digital processors are usually designed with a fixed word length to facilitate data handling and operation. The typical word length is a power of two and is compatible with memory data size. In many advanced processors, the word length is 32-bit, 64-bit, or 128-bit.

Although these traditional word lengths are useful for many scientific, data processing, business, medical, military, and commercial applications, they may not be convenient for applications where the word length may have any size depending on the type of information to be represented. Examples of such applications include network data processing and packet communications. In these applications, the data items may be represented by the minimum word size to optimize data transfers and switching. In addition, the word size may vary within the same processing unit. Furthermore, even when the data word sizes are comparable with the native word size of the processor, there are cases where blocks of data or long words are processed and these blocks of data may occupy at boundaries that are not aligned with the native word boundary.

Existing techniques to handle data with word sizes larger than the processor's native size are inefficient. These techniques involve execution of a large number of operations to shift and perform logical operations on the data items to be aligned or merged.

BRIEF DESCRIPTION OF THE DRAWINGS

The features and advantages of the present invention will become apparent from the following detailed description of the present invention in which.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
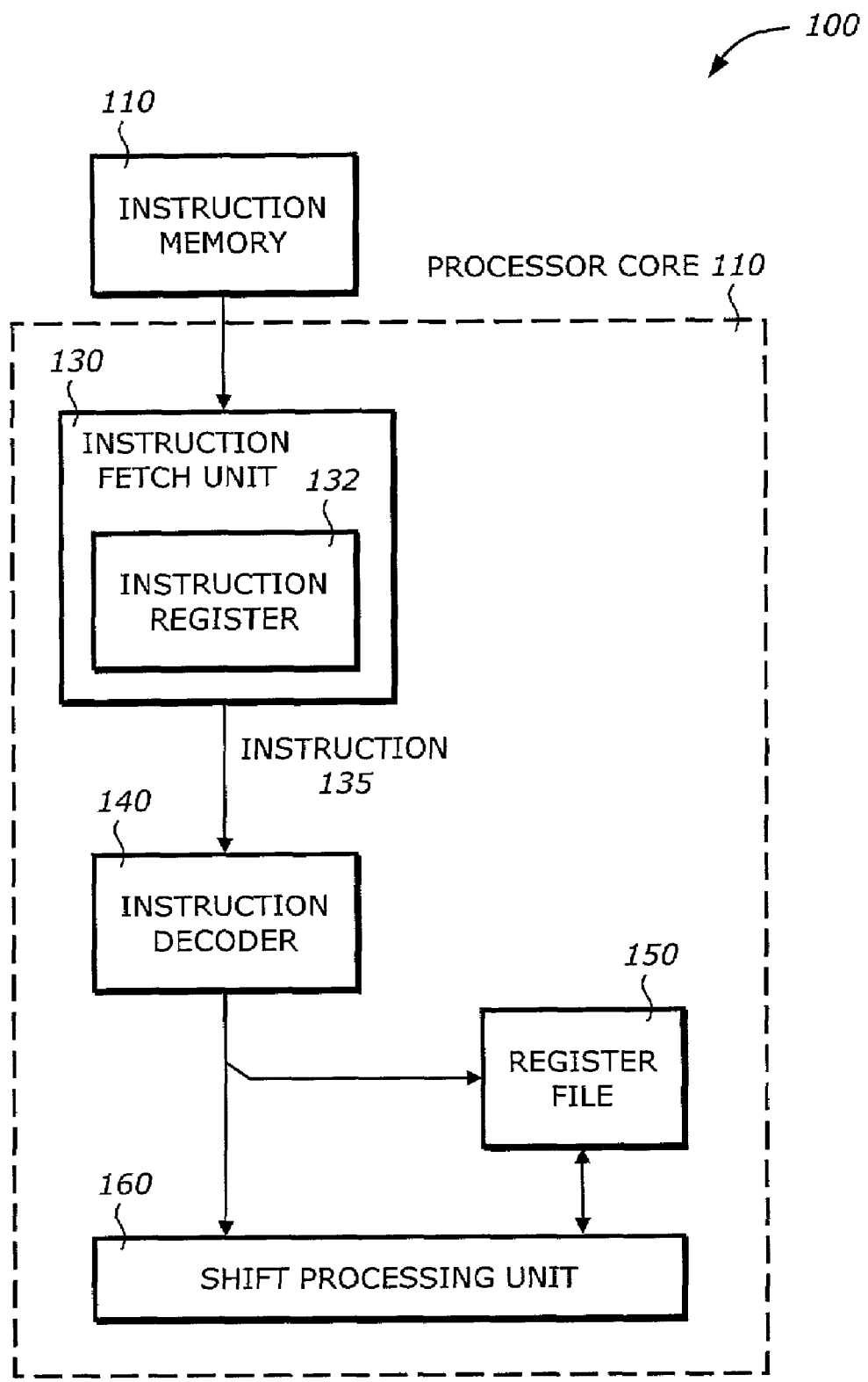
FIG. 1 is a diagram illustrating a system in which one embodiment of the invention can be practiced.

FIG. 1 is a diagram illustrating a system 100 in which one embodiment of the invention can be practiced. The system 100 includes an instruction memory 110 and a processor core 120.

The instruction memory 110 stores instructions to be fetched and executed by the processor core 120. The instruction memory 110 may be implemented by random access memory (RAM), such as static RAM (SRAM) or dynamic RAM (DRAM), or non-volatile memory such as read only memory (ROM), programmable ROM (PROM), erasable ROM (EROM), electrically erasable ROM (EEROM), flash memory, or any other storage media.

The processor core 120 is the core of a central processing unit (CPU) or a processor that can execute a program and/or instructions. The processor core 120 is interfaced to the instruction memory 110 either directly or indirectly through an interface circuit (not shown) such as a memory controller. The processor core 120 includes an instruction fetch unit 130, an instruction decoder 140, a register file 150, and a shift processing unit 160. The processor core 120 may contain other circuits or elements that are not necessary for an understanding of the invention. Examples of these elements include a branch prediction logic, an instruction buffer unit, a code cache, a data cache, and other functional units.

The instruction fetch unit 130 fetches the instructions from the instruction memory 130 and stores in an instruction register 132. The instruction register holds a copy of the instruction. The instruction fetch unit 130 may contain a program counter to store the address of the instruction.

The instruction decoder 140 decodes the instruction 135 stored in the instruction register 132. The instruction decoder 140 may have a number of decoder sections that decodes portions of the instruction. The format of the instruction 135 may have a number of forms depending on the instruction set architecture (ISA) employed by the processor core 120.

The register file 150 includes a number of registers that store temporary data to be operated on during the execution of the instruction 135. The register file may be read or written to the shift processing unit 160. The number of registers in the register file depends on the ISA and may be sixteen, thirty two, or any suitable number. The registers provide the source operands for the shift processing unit 160. In addition, the registers also provide the destination for the shift processing unit 160.

The shift processing unit 160 performs shifting operations including left and right shifts, left and right shifts with zero fill, right shift with sign fill, left and right shifts with register fill, left and right shifts through carry, etc. These shift operations are efficient in data re-alignment and data merging. Although the term "shifting" is used throughout this description, it is understood that it includes both shifting and rotation. As is known by one skilled in the art, a rotation operation is a circular shift operation.

A processor which operates on data taken from a network may be charged with the tasks of re-aligning data which begins at a given or byte-, bit offset in a starting address or register, and continues for several words. This requirement occurs frequently when a processor de-encapsulates packet data. This process involves the removal of several bytes from the beginning of a packet, possibly leaving the remaining data un-aligned to the processor's word boundary. Another situational example is the merging of data. These examples are illustrated in FIGS. 2A and 2B.

Figure 2A:
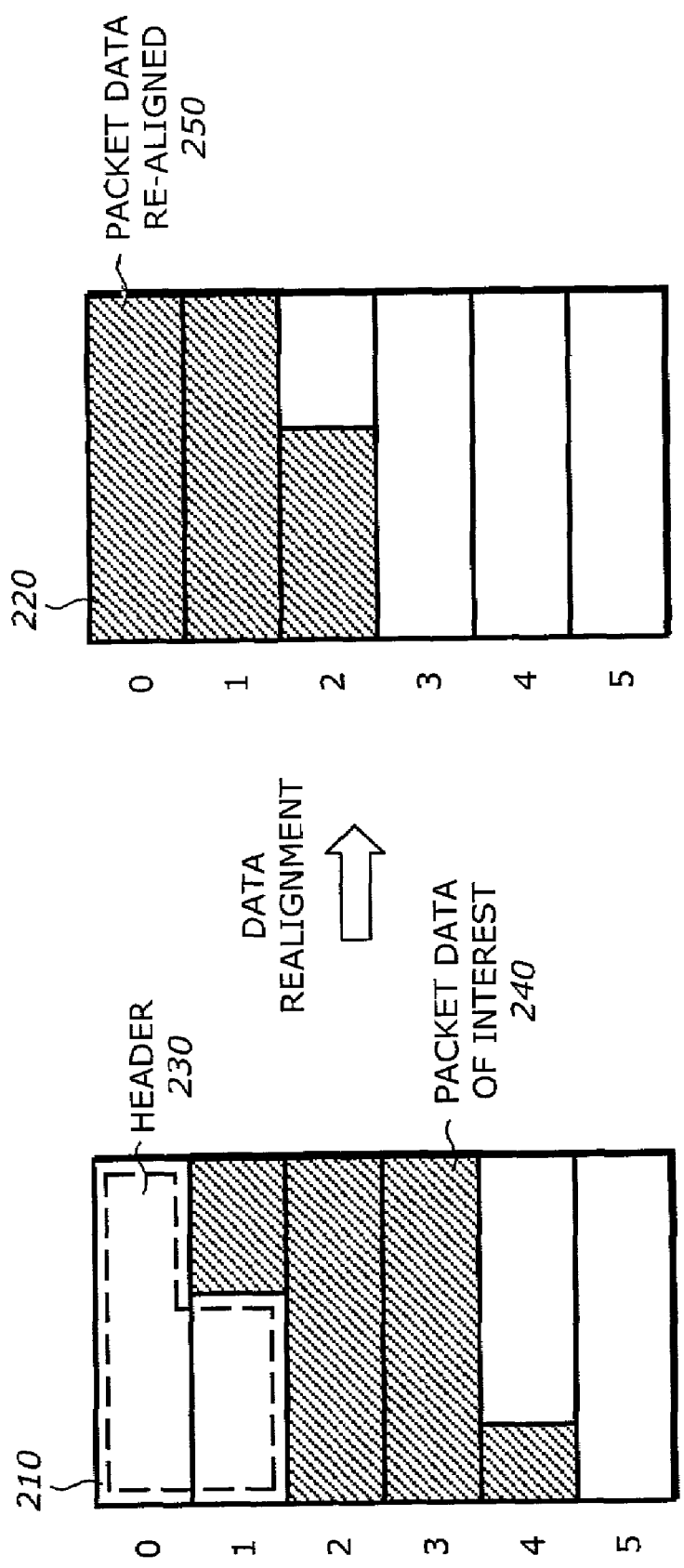
FIG. 2A is a diagram illustrating an example for data re-alignment according to one embodiment of the invention.
Figure 2B:
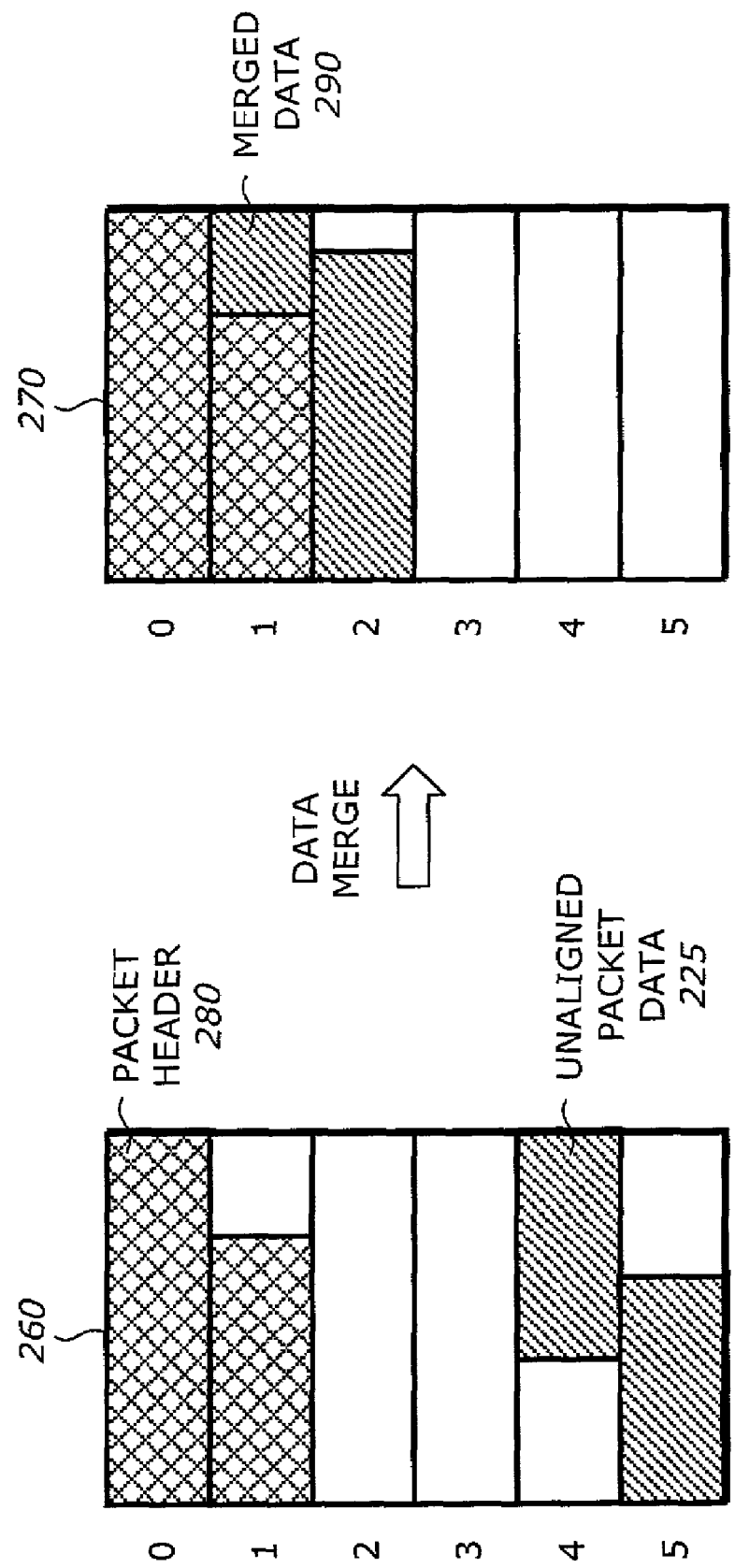
FIG. 2B is a diagram illustrating an example for data merging according to one embodiment of the invention.

FIG. 2A is a diagram illustrating an example for data re-alignment according to one embodiment of the invention. The example includes data blocks 210 and 220.

The data block 210 contains five words of packet data before the data re-alignment. Typically the packet data is received from a transmitting source. This data block includes a header 230 and the packet data 240. The header 230 contains information regarding the packet data such as identification code, check sum, packet number, type of packet, etc. After this information is used for administrative, error checking, or book-keeping purposes, it is usually discarded or removed. The packet data 240 contain the actual data to be processed. To facilitate the processing, it is desired that the packet data 240 is aligned at the word boundary. To do so, a data re-alignment operation is performed.

The data block 220 represents the re-aligned packet data after the data re-alignment operation. The packet data 240 becomes the packet data 250. The header 230 is removed and the packet data 250 is shifted to start at the word boundary beginning from word 0. The header 230 may not be actually removed and the packet data 250 may overwrite the header 230. By re-aligning the packet data at word boundary, the data processing becomes more efficient. Subsequent operations may include data movement, comparisons, arithmetic and logical operations, or any other suitable operations.

FIG. 2B is a diagram illustrating an example for data merging according to one embodiment of the invention. The example includes data blocks 260 and 270.

The data block 260 contains five words of data before data merging. Typically this packet data is the data to be sent to a receiving source. The data block 260 includes a packet header 280 and an unaligned packet data 285. The packet header 280 and the unaligned packet data 285 are separated by unused portions. It is desired to merge the packet header 280 and the unaligned packet data 285 into a contiguous sequence of words. To do so, a data merge operation is performed.

The data block 270 contains a merged data 290. The merged data 290 forms a contiguous words by combining the packet header 280 and the unaligned packet data 285. The data merging operation is performed by shifting the unaligned packet data 285 to the end of the packet header 280.

As is known by one skilled in the art, the data re-alignment and data merge operations are not only useful for communication or network applications. They are also useful for traditional computer operations such as text manipulations, data movements, information processing, string operations, array manipulations, etc.

Figure 3:
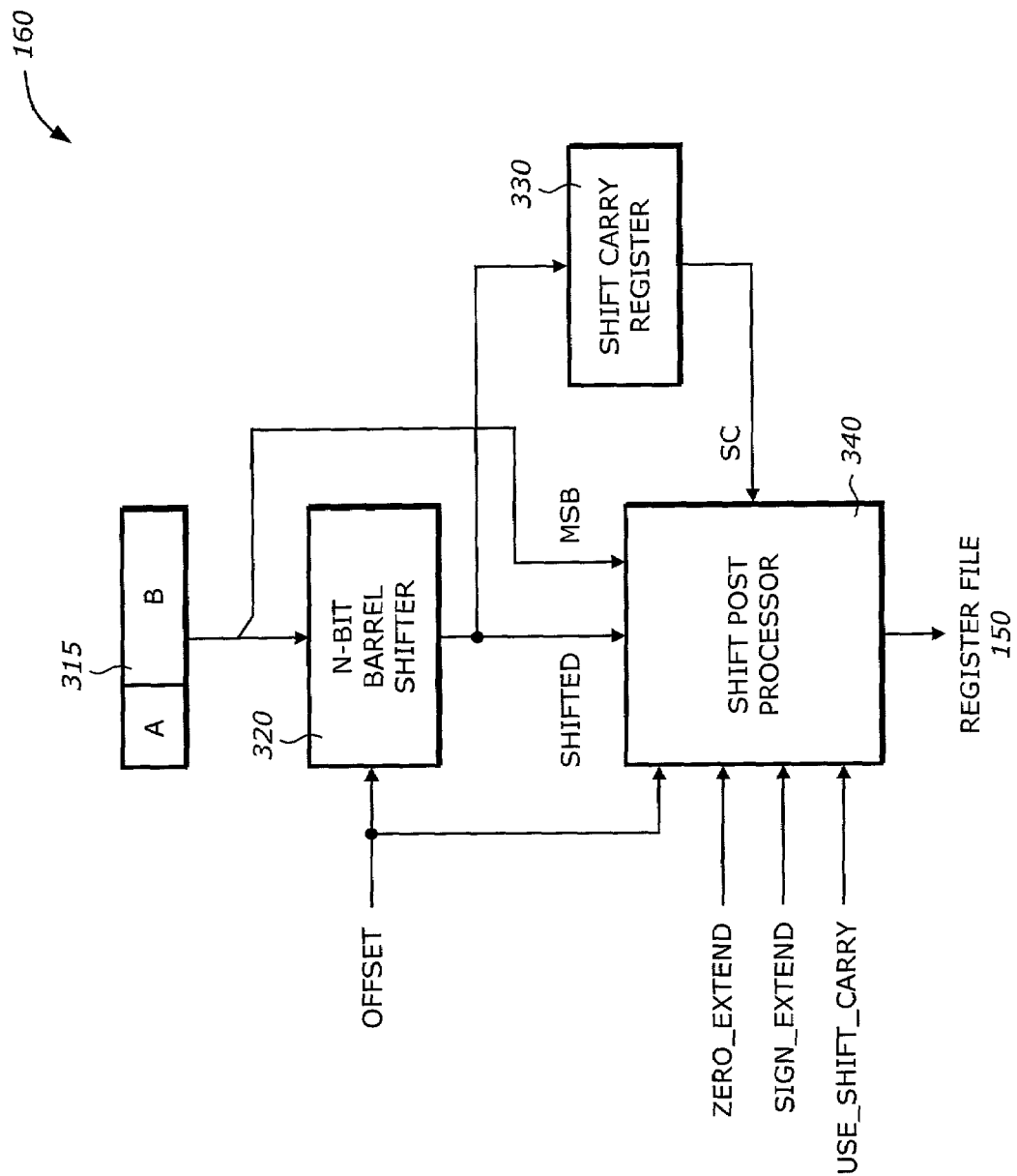
FIG. 3 is a diagram illustrating the shift processing unit shown in FIG. 1 according to one embodiment of the invention.

FIG. 3 is a diagram illustrating the shift processing unit 160 shown in FIG. 1 according to one embodiment of the invention. The shift processing unit 160 includes a barrel shifter 310, a shift carry (SC) register 330, and a shift post processor 340.

The barrel shifter 310 receives an operand 315 to be operated upon. The operand 315 may come from the register file 150 (FIG. 1). In this example, the operand 315 contains data elements A and B. The barrel shifter 310 performs a shift in any direction with any number of bits according to the OFFSET parameter in the decoded instruction provided by the decoder 140 (FIG. 1). Since the barrel shifter 310 performs multiple-bit shifts in a single clock cycle, the shifting operation can be performed very fast. Typically, the barrel shifter 310 has the same word size as that of the register file 150 (FIG. 1) as defined by the processor 100, although this is not necessary. The output of the barrel shifter 310 is a group of N bits from shifted(l) to shifted(N) where N is the word size of the shift processing unit 160.

The SC register 330 stores the output of the barrel shifter 310. The SC register 330 has the same word size with the barrel shifter 310 and the register file 150 (FIG. 1). The SC register 330 is visible to the programmer and can be explicitly accessed through data movement instructions available in the Instruction Set Architecture (ISA). Each time the barrel shifter 310 is used for any shifting instruction, including left or right rotate, arithmetic or logical shift, the raw output of the barrel shifter 310 before post processing by the shift post processor 340 is saved in the SC register 330. Since the SC register 330 stores the output of the barrel shifter 310, the shift post processor 340 can perform post processing operations on the currently shifted operands from the barrel shifter 310 and the contents of the SC register 330. The output of the SC register 330 is a group of N bits from SC(1) to SC(N) where N is the word size of the shift processing unit 160.

The shift post processor 340 performs a number of operations after the shifting by the barrel shifter 310. These post-shift operations may include replacing a portion of the shifted operand with zero, sign bits (e.g., sign extension), or a portion of the SC register 330. The output of the shift post processor 340 may be written to the register file 150 (FIG. 1), or any appropriate destination register. The shift post processor 340 receives the following inputs: the shifted operand from the barrel shifter 310, the output of the SC register 330, OFFSET, ZERO_EXTEND, SIGN_EXTEND, USE_SHIFT_CARRY, and MSB. The OFFSET is the same parameter used by the barrel shifter 310. The ZERO_EXTEND and SIGN_EXTEND are control bits to indicate if the operand is to be zero and sign extended, respectively. The USE_SHIFT_CARRY is a control bit to indicate if the shifting is performed via the carry bit. In one embodiment, the OFFSET, ZERO_EXTEND, SIGN_EXTEND, USE_SHIFT_CARRY are provided by the instruction decoder 140 (FIG. 1). The MSB is the most significant bit of the operand 315.

Figure 4:
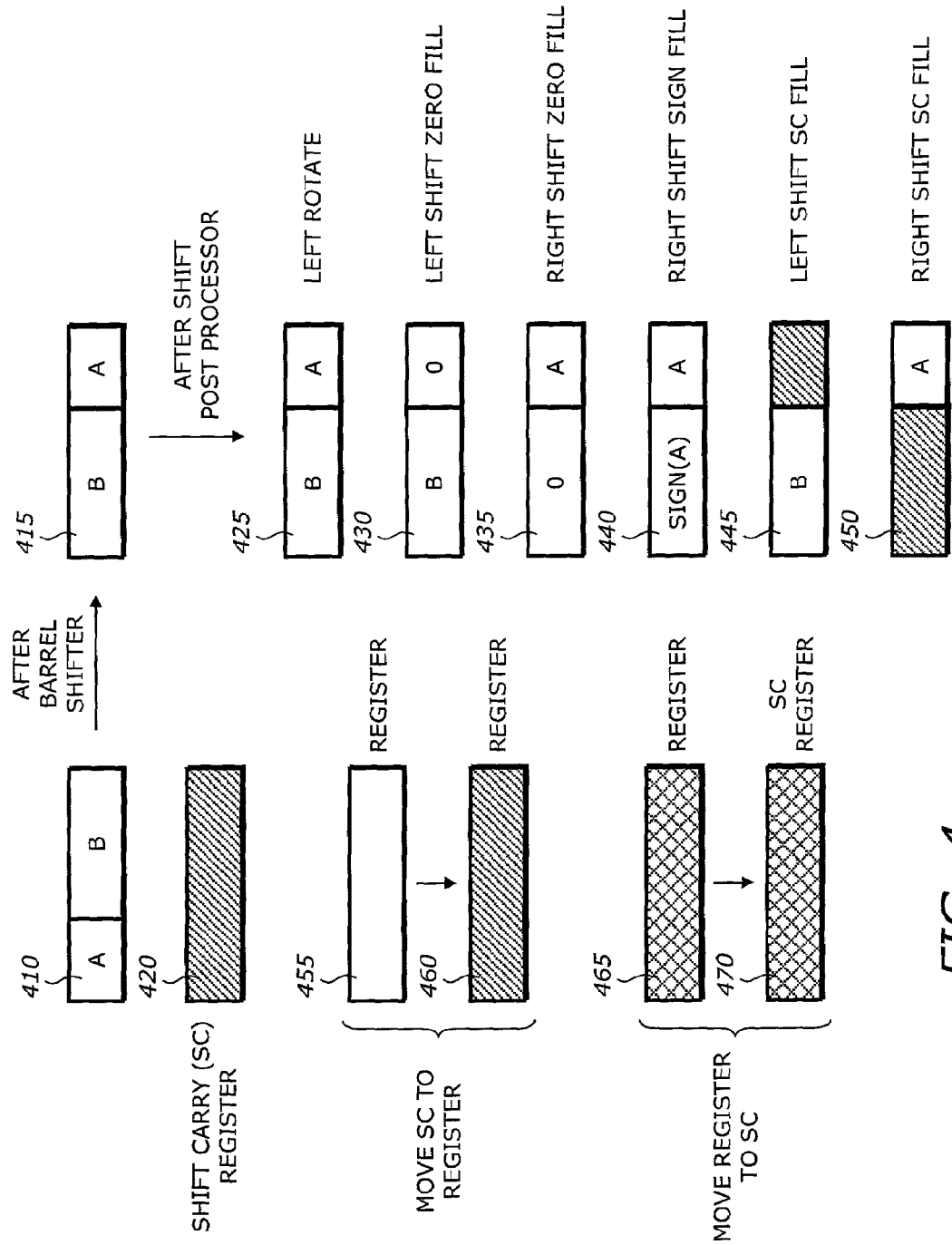
FIG. 4 is a diagram illustrating various shift instructions for the shift processing unit according to one embodiment of the invention.

FIG. 4 is a diagram illustrating various shift instructions for the shift processing unit 160 shown in FIG. 1 according to one embodiment of the invention. The example includes operands 410, 415, 420, 425, 430, 435, 440, 445, 450, 455, 460, 465, and 470.

The operand 410 represents the input to the barrel shifter 310 (FIG. 3). In this example, the operand 410 includes two data elements A and B, each occupying an arbitrary sub-word length within the word length of the processor 100. The operand 415 represents the output of the barrel shifter 310. In this example, the barrel shifter 310 performs a rotation to swap the data elements A and B. The operand 420 represents the contents of the SC register 330 (FIG. 3).

The operand 425 is the result of the execution of the instruction LEFT ROTATE. In other words, the shift post processor 340 leaves the output of the barrel shifter 310 unchanged.

The operand 430 is the result of the execution of the instruction LEFT SHIFT ZERO-FILL which replaces the data element A with zeros. The operand 435 is the result of the execution of the instruction RIGHT SHIFT ZERO-FILL which replaces the data element B with zeros. The operand 440 is the result of the execution of the instruction RIGHT SHIFT SIGN-FILL which extends the sign bit of the data element A to occupy the entire word. The operand 445 is the result of the execution of the instruction LEFT SHIFT SC-FILL which replaces the data element A with the corresponding portion of the SC register 330 (FIG. 3). The operand 450 is the result of the execution of the instruction RIGHT SHIFT SC-FILL which replaces the data element B with the corresponding portion of the SC register 330.

The operand 455 represents the contents of a register before the execution of the instruction MOVE SC TO REGISTER. The operand 460 represents the contents of the register after the execution of the instruction MOVE SC TO REGISTER. This instruction moves the contents of the SC register 330 to a specified register. The operand 465 represents the contents of a register before the execution of the instruction MOVE REGISTER TO SC. The operand 470 represents the contents of the SC register 330 after the execution of the instruction MOVE REGISTER TO SC. This instruction moves the contents of a specified register to the SC register 330. Normally, after the movement, the contents of the specified register remain unchanged.

Figure 5A:
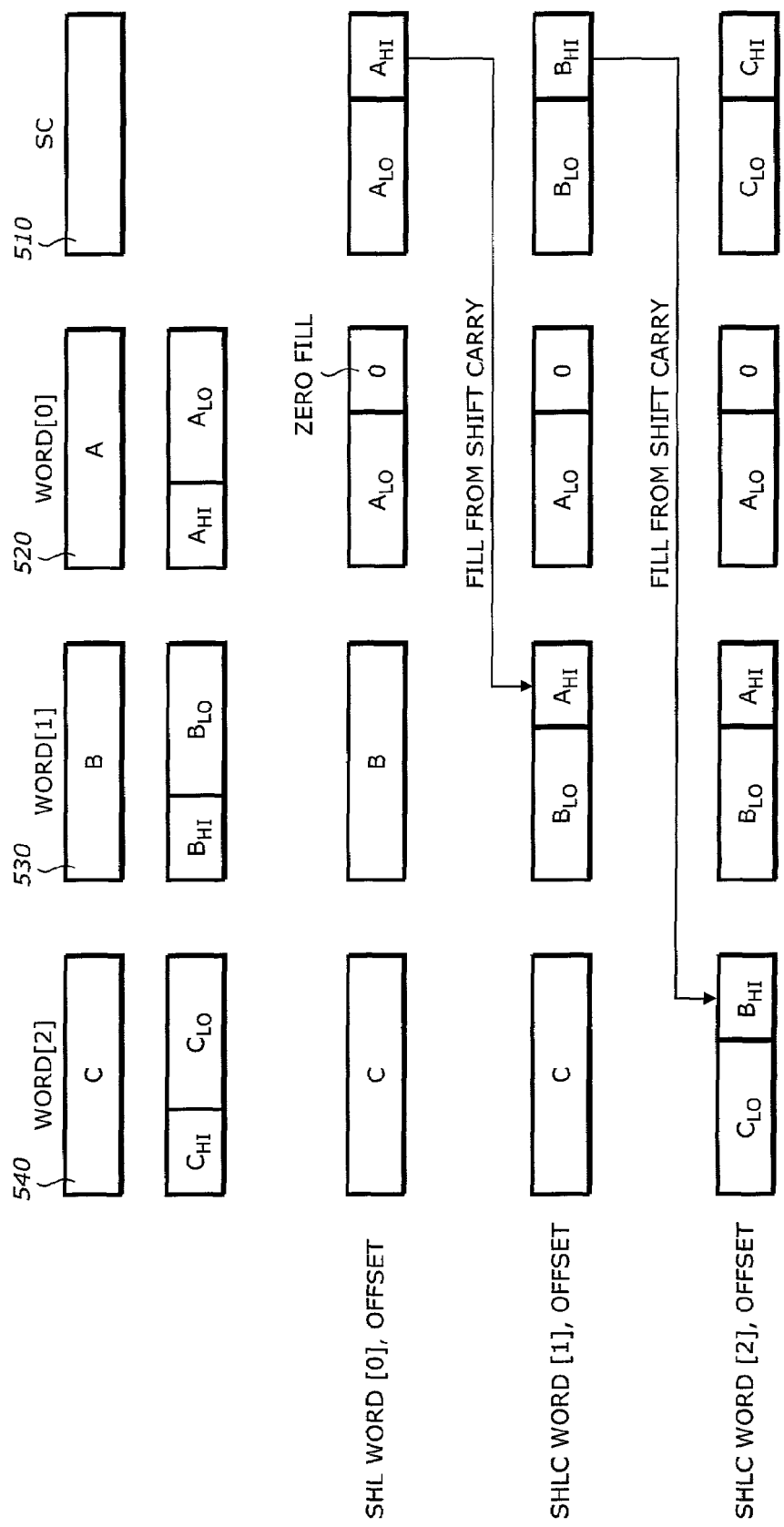
FIG. 5A is a diagram illustrating an example of a long word left shift operation according to one embodiment of the invention.

FIG. 5A is a diagram illustrating an example of a long word left shift operation according to one embodiment of the invention. In this example, the long word operand includes three words: word[0] 520, word[1] 530, and word[2] 540 corresponding to data elements A, B, and C, respectively. The SC register 510 stores shifted or rotated word. Suppose it is desired to shift the long word operand left by an amount equivalent to the offset parameter. This amount is represented by the portions denoted AHI, BHI, and CHI in the data elements A, B, and C, respectively. The remaining portions of the data elements A, B, and C are denoted ALO, BLO, and CLO, respectively. Zero's will be filled in the least significant word (data element A) to occupy the shifted bit positions.

In general, a long word having N words is shifted left by executing N left shift instructions. The shifting sequence starts with the least significant word, or the rightmost word in the long word operand. In this example, there are three left shifts. The first instruction is SHL word[0], offset. This instruction causes word[0] to be shifted left and zero's filled in the right to occupy the shifted bit positions. At the same time, the SC register 510 contains the left rotated data elements A. The SC register 510 stores ALO AHI as shown.

The second instruction is SHLC word[1], offset. This instruction causes a left shift of word[1] 530 through carry. The AHI portion in the SC register 510 is shifted to occupy the shifted bit positions of word[1] 530 from the right through carry. Word[1] 530 will become BLO AHI. At the same time, the SC register 510 contains the left rotated data elements B, or BLO BHI as shown. After this instruction is executed, it is seen that the data element A is shifted left to cross the boundary between A and B.

The third instruction is SHLC word[2], offset. As in the second instruction, this instruction causes a left shift of word[2] 540 through carry. The BHI portion in the SC register 510 is shifted to occupy the shifted bit positions of word[2] 540 from the right through carry. Word[2] 540 will become CLO BHI. At the same time, the SC register 510 contains the left rotated data elements C, or CLO CHI as shown. After this instruction is executed, it is seen that the data element B is shifted left to cross the boundary between B and C. In addition, the data element C is left shifted and the CHI portion is shifted out of word[2] 540. In the end, the long word operand is now shifted left with zero's filled in the shifted bit positions starting from the rightmost.

Figure 5B:
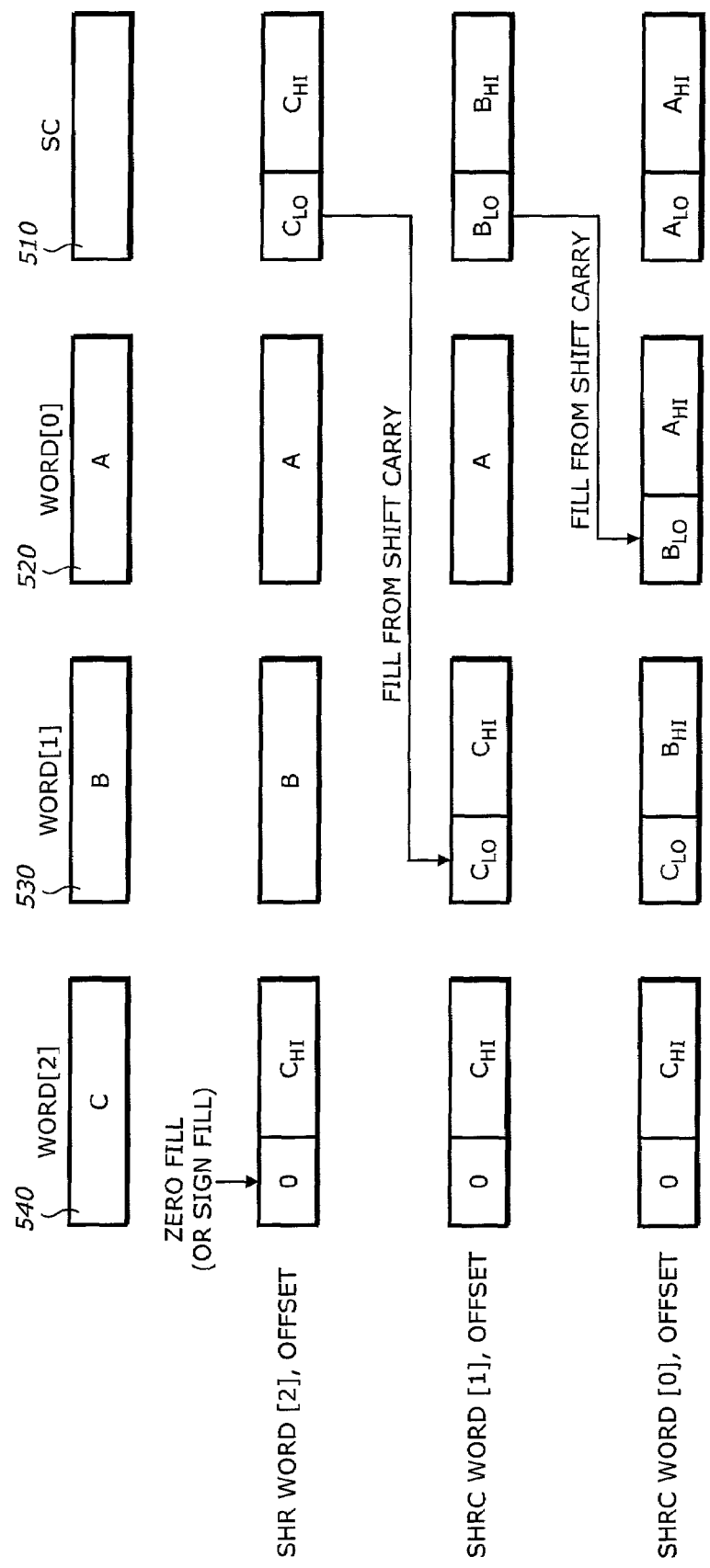
FIG. 5B is a diagram illustrating an example of a long word right shift operation according to one embodiment of the invention.

FIG. 5B is a diagram illustrating an example of a long word right shift operation according to one embodiment of the invention. This example is similar to the example shown in FIG. 5A except that the shift operation is a right shift. As in the example of FIG. 5A, the long word operand includes three words: word[0] 520, word[1] 530, and word[2] 540 corresponding to data elements A, B, and C, respectively. The SC register 510 stores shifted or rotated word. For a right shift operation, zero's are filled in to occupy the shifted bit positions starting from the left, or the most significant word.

In general, a long word having N words is shifted right by executing N right shift instructions. The shifting sequence starts with the most significant word, or the leftmost word in the long word operand. In this example, there are three right shifts. The first instruction is SHR word[2], offset. This instruction causes word[2] 540 to be shifted right and zero's filled in from the left to occupy the shifted bit positions. At the same time, the SC register 510 contains the right rotated data elements C. The SC register 510 stores CLO CHI as shown.

The second instruction is SHRC word[1], offset. This instruction causes a right shift of word[1] 530 through carry. The CLO portion in the SC register 510 is shifted to occupy the shifted bit positions of word[1] 530 from the left through carry. Word[1] 530 will become CLO BHI. At the same time, the SC register 510 contains the right rotated data elements B, or BLO BHI as shown. After this instruction is executed, it is seen that the data element C is shifted right to cross the boundary between C and B.

The third instruction is SHRC word[0], offset. As in the second instruction, this instruction causes a right shift of word[0] 510 through carry. The BLO portion in the SC register 510 is shifted to occupy the shifted bit positions of word[0] 520 from the left through carry. Word[0] 520 will become BLO AHI. At the same time, the SC register 510 contains the right rotated data elements A, or ALO AHI as shown. After this instruction is executed, it is seen that the data element B is shifted right to cross the boundary between B and A. In addition, the data element A is right shifted and the ALO portion is shifted out of word[0] 520. In the end, the long word operand is now shifted right with zero's filled in the shifted bit positions starting from the leftmost.

Figure 6:
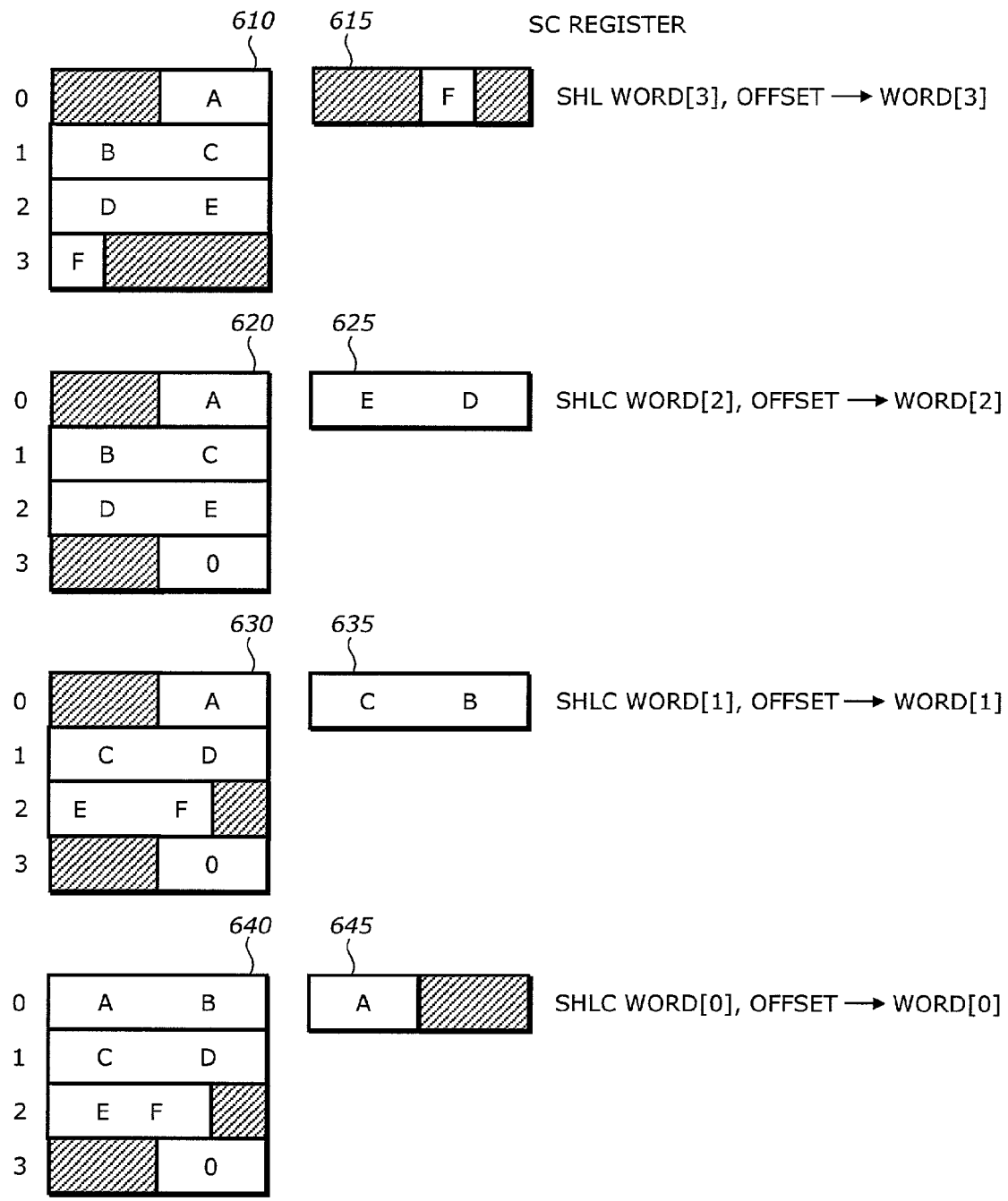
FIG. 6 is a diagram illustrating an example of a data re-alignment operation according to one embodiment of the invention.

FIG. 6 is a diagram illustrating an example of a data re-alignment operation according to one embodiment of the invention. The example includes blocks 610, 620, 630, and 640, and operands 615, 625, 635, and 645.

The data blocks 610, 620, 630, and 640 contain the data items to be shifted for re-alignment. Each block has four words: word[0], word[1], word[2] and word[3]. Each block represents a step of a sequence of shifts and offset movements. The offset is the unaligned offset from the first word of the block, word[0]. Word[0] contains the offset and data item A. Word[1] contains data items B and C. Word[2] contains data item D and E. Word[3] contains data items F and an unused data portion. The operands 615, 625, 634, and 645 represent the contents of the SC register at each step of the sequence.

At step 1, the instruction SHL word[3] is executed and the offset is moved to word[3]. The operand 615 contains the left shifted word [3]. At step 2, word[3] contains unused data portion and zeros. Then, the instruction SHLC word[2] is executed. The operand 625 contains the left shifted word[2]. At the same time, a portion of the operand 625 is combined with a portion of the operand 615 such that the data item E is combined with the data item F. At step 3, word[2] contains the combined data items E and F. Then, the instruction SHLC word[1] is executed. The operand 635 contains the left shifted word[1]. At the same time, a portion of the operand 635 is combined with a portion of the operand 625 such that data item C is combined with data item B. At step 4, word[1] contains data items C and D. Then, the instruction SHLC word[0] is executed. At the same time, a portion of the operand 645 is combined with a portion of the operand 635 such that the data item A is combined with the data item B. Word[0] contains data items A and B. At the end of the sequence, the entire four words are properly aligned at the word boundary.

The operation described above performs the data re-alignment as shown in FIG. 2A. The shift instructions can also be used to merge byte-oriented data from one region of memory to another as shown in FIG. 2B. Encapsulation, the process of adding headers or trailers to packet data, may also leave data misaligned.

Figure 7:
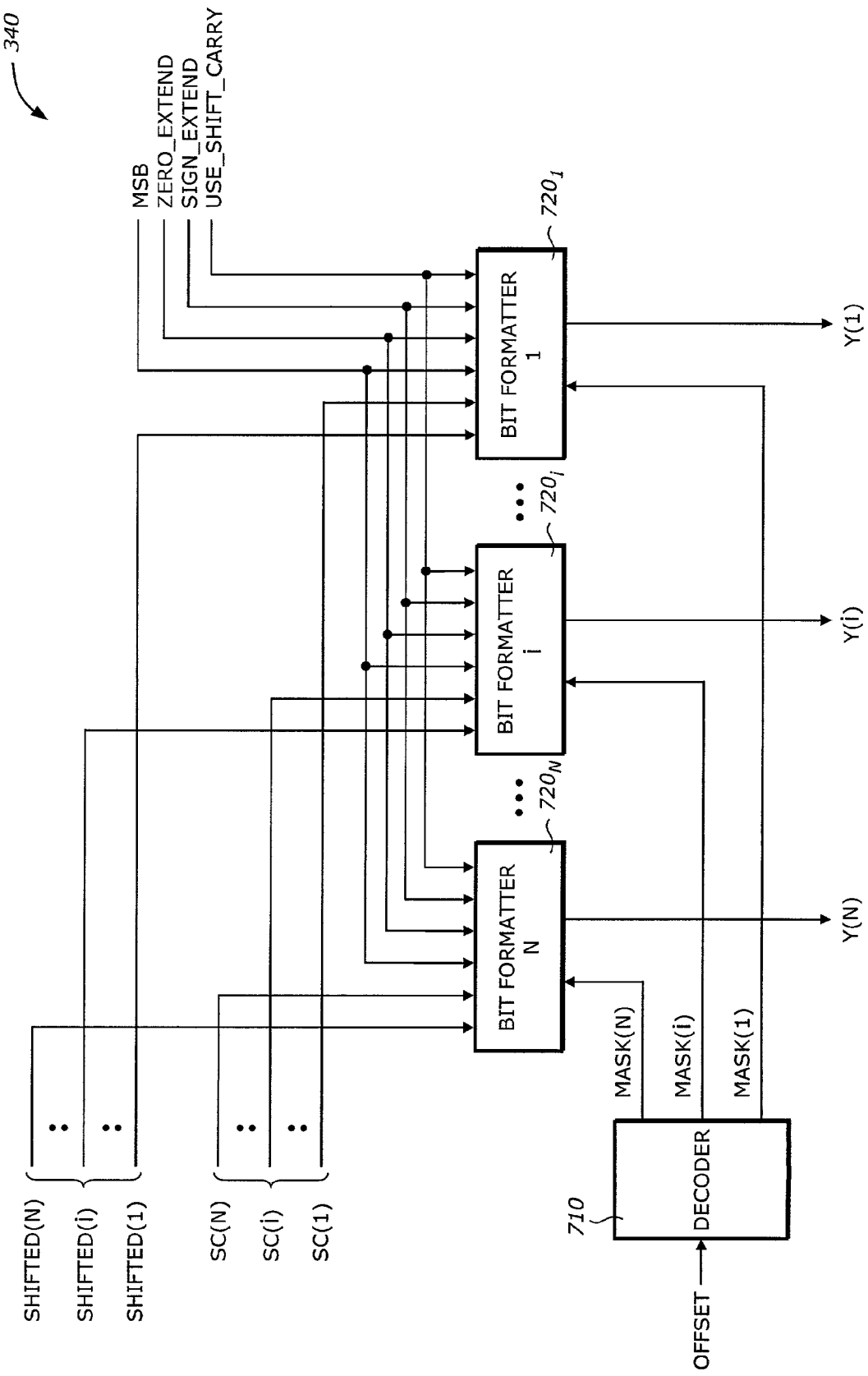
FIG. 7 is a diagram illustrating the shift post processor shown in FIG. 3 according to one embodiment of the invention.

FIG. 7 is a diagram illustrating the shift post processor 340 shown in FIG. 3 according to one embodiment of the invention. The shift post processor 340 includes a decoder 710 and N bit formatters 7201 to 720N, where N is an integer equal to the word size of the shift processing unit 160 (FIG. 1).

The decoder 710 receives the OFFSET parameter and generates a shift field mask MASK [1 . . . N]. The shift field mask has N bits, mask(1) to mask (N), corresponding to N-bit word of the shifted operand. The shift mask field defines the bit positions that are affected by the post processing operations. In one embodiment, a logical one in the mask(k) indicates that the bit at the k-th position is affected by the post processing operation, and a logical zero allows the bit at the k-th position to pass through unmodified. The decoder essentially converts the OFFSET value into a bit pattern having a group of consecutive mask bits that corresponds to the portion of the operand to be operated upon.

Each of the bit formatters 720l to 720N performs a bit post processing operation on each bit of the shifted output of the barrel shifter, shifted(1) to shifted(N). Each of the bit formatters receives the corresponding mask(k) bit and the SC(k) bit. In addition, all the bit formatters 7201 to 720N receive the same control bits MSB, ZERO_EXTEND, SIGN_EXTEND, and USE_SHIFT_CARRY. The bit formatters 7201 to 720N generate the N-bit output, y(1) to y(N).

Figure 8:
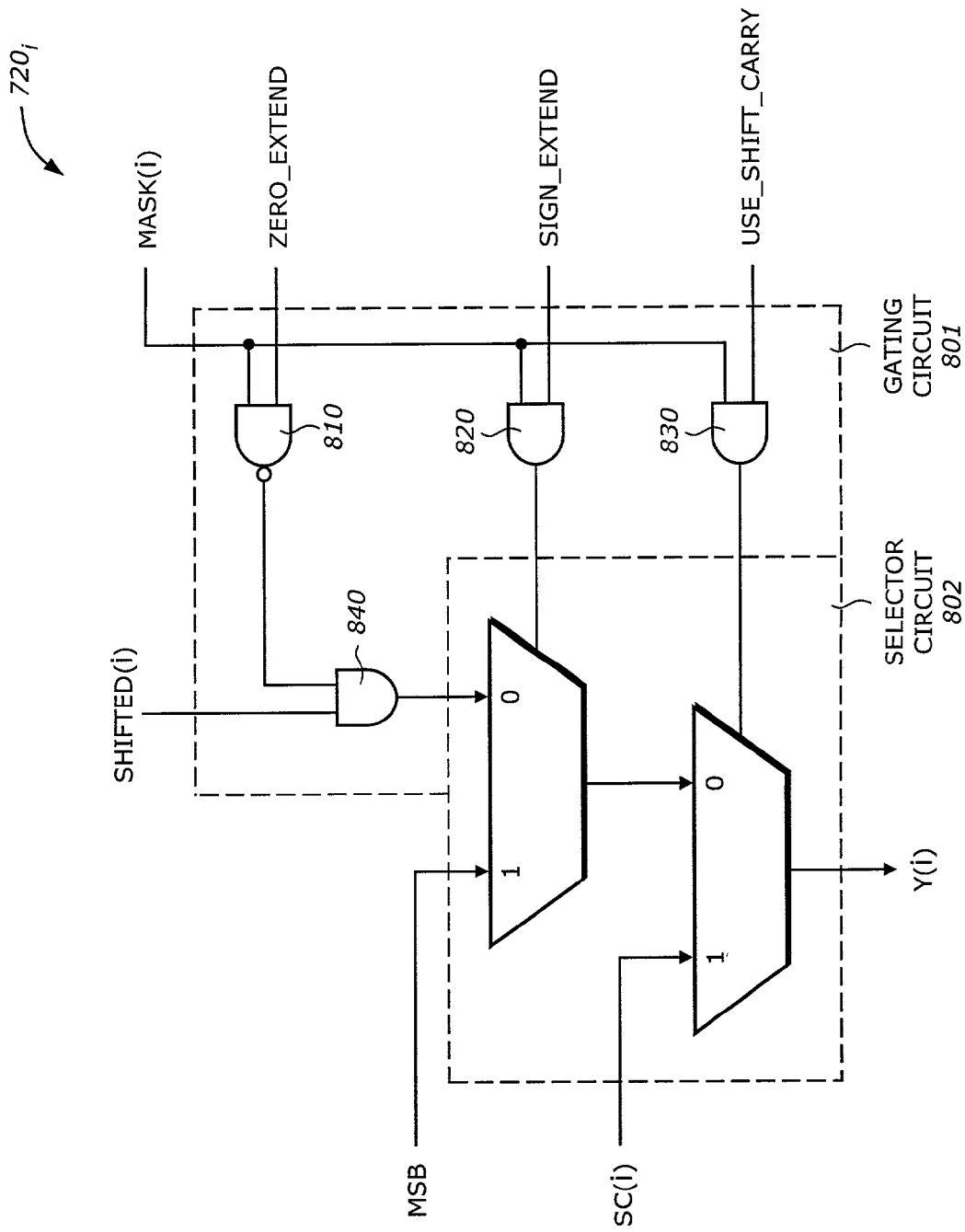
FIG. 8 is a diagram illustrating the bit formatter shown in FIG. 7 according to one embodiment of the invention.

FIG. 8 is a diagram illustrating the bit formatter 720$i$ shown in FIG. 7 according to one embodiment of the invention. The bit formatter include a gating circuit 801 and a selector circuit 802.

The gating circuit 801 gates the ZERO_EXTEND, SIGN_EXTEND, and USE_SHIFT_CARRY signals by the mask(i) bit. In one embodiment, the gating circuit 801 includes NAND gate 810, AND gates 820, 830, and 840. When the mask(i) bit is logical zero, indicating that the shifted(i) bit is passed through unmodified, the NAND gate 810 gates the shifted(i) bit to the selector circuit 802. When the mask(i) bit is logical one, the shifted(i) bit is modified according to the ZERO_EXTEND, SIGN_EXTEND, and USE_SHIFT_CARRY control signals.

The selector circuit 802 selects the proper bit operand to generate the output bit y(i) according to the mask(i) bit and the ZERO_EXTEND, SIGN_EXTEND, and USE_SHIFT_CARRY control signals. In one embodiment, the selector circuit 802 includes two two-to-one multiplexers 850 and 860. Of course, the two multiplexers 850 and 860 may be combined into a single combinational logic circuit which operates the same way as two multiplexers connected in cascade.

The bit formatter 720$i$ performs logic operations on the shifted(i) bit using the MSB and the SC(i) bits according to the control bits mask(i), ZERO_EXTEND, SIGN_EXTEND, and USE_SHIFT_CARRY control signals. Let m, sc, msk, ze, se, and u denote the MSB, SC(i), bits mask(i), ZERO_EXTEND, SIGN_EXTEND, and USE_SHIFT_CARRY control signals. Let shft and y denote the shifted(i) and y(i) signals. The bit formatter 720$i$ essentially performs the logic operations according to the following truth table.

| msk | ze | de | u | Y |
|---|---|---|---|---|
| 0 | X | X | X | Shft |
| 1 | 1 | 0 | 0 | Shft |
| 1 | X | X | 1 | Sc |
| 1 | 0 | 1 | 1 | Msb |

Note that ze and se are mutually exclusive. In other words, if zero extension is desired, then sign extension is not available. Similarly, if sign extension is desired, then zero extension is not available.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a shift post processor;
   a shifter to shift an operand according to an offset parameter, generating a shifted operand; and
   a register coupled to the shift post processor capable of transferring a shift carry operand stored in the register to the shift post processor, and coupled to the shifter to store the shifted operand after any transfer of the shift carry operand;
   wherein the shift post processor is coupled to the shifter and the register to process the shifted operand to generate an output based on at least a control signal and a mask field; and
   wherein the shift post processor comprises
      a decoder to decode the offset parameter into the mask field, the mask field having a plurality of mask bits, each of the mask bits corresponding to a bit position of the shifted operand, and
      at least one bit formatter coupled to the decoder to format the shifted operand using the control signal and the mask field, the at least one bit formatter comprising (i) a gating circuit to gate the control signal using the mask bit, and (ii) a selector circuit coupled to the gating circuit to select one of a bit at the bit position of the shifted operand, the shift carry operand, and a most significant bit of the operand based on the gated control signal.

2. The apparatus of claim 1 wherein the control signal is one of a zero extension signal, a sign extension signal, and a use shift carry signal.

3. The apparatus of claim 2 wherein when the mask bit is negated, the corresponding bit in the shifted operand is passed through unmodified.

4. The apparatus of claim 2 wherein when the mask bit is asserted, the corresponding bit in the shifted operand is operated upon according to the control signal.

5. The apparatus of claim 1 wherein the selector circuit selects the bit at the bit position of the shifted operand when the mask bit is negated.

6. The apparatus of claim 1 wherein the selector circuit selects the bit at the bit position of the shifted operand when the mask bit is asserted, the zero extension signal is asserted, the sign extension signal is negated, and the use shift carry signal is negated.

7. The apparatus of claim 1 wherein the selector circuit selects the bit at the bit position of the shift carry operand when the mask bit is asserted and the use shift carry signal is asserted.

8. The apparatus of claim 1 wherein the selector circuit selects the most significant bit when the mask bit is asserted, the zero extension signal and the use shift carry signal are negated, and the sign extension signal is asserted.

9. The apparatus of claim 2, wherein the use shift carry signal instructs the shift post processor to process the shifted operand based on the shift carry operand.

10. A method comprising:
shifting an operand according to an offset parameter, generating a shifted operand;
storing the shifted operand in a register capable of transferring a shift carry operand stored in the register before storing the shifted operand; and
processing the shifted operand to generate an output based on at least a control signal and a mask field by a processing method comprising decoding the offset parameter into the mask field, the mask field having a plurality of mask bits, each of the mask bits corresponding to a bit position of the shifted operand, wherein processing the shifted operand comprises (i) gating the control signal using the mask bit, and (ii) selecting one of a bit at the bit position of the shifted operand, the shift carry operand, and a most significant bit of the operand based on the gated control signal.

11. The method of claim 10 wherein the control signal is one of a zero extension signal, a sign extension signal, and a use shift carry signal.

12. The method of claim 11 wherein when the mask bit is negated, the corresponding bit in the shifted operand is passed through unmodified.

13. The method of claim 11 wherein when the mask bit is asserted, the corresponding bit in the shifted operand is operated upon according to the control signal.

14. The method of claim 10 wherein selecting comprises selecting the bit at the bit position of the shifted operand when the mask bit is negated.

15. The method of claim 10 wherein selecting comprises selecting the bit at the bit position of the shifted operand when the mask bit is asserted, the zero extension signal is asserted, the sign extension signal is negated, and the use shift carry signal is negated.

16. The method of claim 10 wherein selecting comprises selecting the bit at the bit position of the shift carry operand when the mask bit is asserted and the use shift carry signal is asserted.

17. The method of claim 10 wherein selecting comprises selecting the most significant bit when the mask bit is asserted, the zero extension signal and the use shift carry signal are negated, and the sign extension signal is asserted.

18. The method of claim 11, wherein, in response to the use shift carry signal, the processing step is based on a shift carry operand transferred from the register before the shifted operand is stored in the register.

19. A processing unit comprising:
a register file having a plurality of registers, each of the registers storing an operand;
an instruction decoder to decode an instruction; and
a shift processing unit coupled to the register file and the instruction decoder to perform an operation on the operand, the shift processing unit comprising:
a shift post processor;
a shifter to shift an operand according to an offset parameter, generating a shifted operand; and
a register coupled to the shift post processor capable of transferring a shift carry operand stored in the register to the shift post processor, and coupled to the shifter to store the shifted operand after any transfer of the shift carry operand;
wherein the shift post processor is coupled to the shifter and the register to process the shifted operand to generate an output based on at least a control signal and a mask field, and
wherein the shift post processor comprises
a decoder to decode the offset parameter into the mask field, the mask field having a plurality of mask bits, each of the mask bits corresponding to a bit position of the shifted operand, and
at least one bit formatter coupled to the decoder to format the shifted operand using the control signal and the mask field, the at least one bit formatter comprising (i) a gating circuit to gate the control signal using the mask bit, and (ii) a selector circuit coupled to the gating circuit to select one of a bit at the bit position of the shifted operand, the shift carry operand, and a most significant bit of the operand based on the gated control signal.

20. The processing unit of claim 19 wherein the control signal is one of a zero extension signal, a sign extension signal, and a use shift carry signal.

21. The processing unit of claim 20 wherein when the mask bit is negated, the corresponding bit in the shifted operand is passed through unmodified.

22. The processing unit of claim 20 wherein when the mask bit is asserted, the corresponding bit in the shifted operand is operated upon according to the control signal.

23. The processing unit of claim 19 wherein the selector circuit selects the bit at the bit position of the shifted operand when the mask bit is negated.

24. The processing unit of claim 19 wherein the selector circuit selects the bit at the bit position of the shifted operand when the mask bit is asserted, the zero extension signal is asserted, the sign extension signal is negated, and the use shift carry signal is negated.

25. The processing unit of claim 19 wherein the selector circuit selects the bit at the bit position of the shift carry operand when the mask bit is asserted and the use shift carry signal is asserted.

26. The processing unit of claim 19 wherein the selector circuit selects the most significant bit when the mask bit is asserted, the zero extension signal and the use shift carry signal are negated, and the sign extension signal is asserted.

27. The processing unit of claim 20, wherein the use shift carry signal instructs the shift post processor to process the shifted operand based on the shift carry operand.

* * * * *